United States Patent
Ikäheimo et al.

(10) Patent No.: US 10,707,722 B2
(45) Date of Patent: Jul. 7, 2020

(54) PROTECTION ARRANGEMENT AND PROTECTION METHOD

(71) Applicant: ABB Schweiz AG, Baden (CH)

(72) Inventors: Jouni Ikäheimo, Kurikka (FI); Tero Känsäkangas, Vaasa (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/679,933

(22) Filed: Nov. 11, 2019

(65) Prior Publication Data

US 2020/0076269 A1 Mar. 5, 2020

Related U.S. Application Data

(63) Continuation of application No. PCT/EP2017/066000, filed on Jun. 28, 2017.

(51) Int. Cl.
| | |
|---|---|
| *H02K 11/20* | (2016.01) |
| *H02K 15/14* | (2006.01) |
| *H02K 5/10* | (2006.01) |
| *H02K 5/22* | (2006.01) |
| *H02K 5/136* | (2006.01) |

(52) U.S. Cl.
CPC ............ *H02K 5/225* (2013.01); *H02K 5/10* (2013.01); *H02K 5/136* (2013.01); *H02K 11/20* (2016.01); *H02K 15/14* (2013.01)

(58) Field of Classification Search
CPC ........ H02K 5/225; H02K 11/20; H02K 15/14; H02K 5/10
USPC .......................................................... 310/71
See application file for complete search history.

(56) References Cited

U.S. PATENT DOCUMENTS

| | | | | |
|---|---|---|---|---|
| 2014/0361643 | A1* | 12/2014 | Kamiya | H02K 5/08 310/43 |
| 2015/0108859 | A1* | 4/2015 | Nakazumi | H02K 5/10 310/71 |
| 2016/0380502 | A1* | 12/2016 | Koiwai | H02K 5/08 310/71 |

FOREIGN PATENT DOCUMENTS

| | | |
|---|---|---|
| EP | 1641105 A2 | 3/2006 |
| EP | 2790301 A2 | 10/2014 |
| WO | 2010105742 A2 | 9/2010 |
| WO | 2016100164 A1 | 6/2016 |

OTHER PUBLICATIONS

European Patent Office, International Search Report & Written Opinion issued in corresponding Application No. PCT/EP2017/066000, dated Sep. 7, 2017, 10 pp.

* cited by examiner

*Primary Examiner* — Jose A Gonzalez Quinones
(74) *Attorney, Agent, or Firm* — Taft Stettinius & Hollister LLP; J. Bruce Schelkopf

(57) ABSTRACT

A protection arrangement of an electric machine which includes a plurality of solid elements layered one after another between a terminal box and a stator of the electric machine. Each of the solid elements includes a cable hole, and the cable holes are arranged to at least partially overlap with each other in order to have a cable channel of the successive cable holes through the solid elements. At least a part of the solid elements are adjustable in a radial direction of the cable channel for making a diameter of the cable channel equal to or smaller than a diameter of the electric cable input in the cable channel in response to adjustment in the radial direction. The protection arrangement comprises a locking mechanism which immobilizes the at least part of solid elements.

20 Claims, 3 Drawing Sheets

US 10,707,722 B2

PROTECTION ARRANGEMENT AND PROTECTION METHOD

FIELD

The invention relates to a protection arrangement of an electric machine and a protection method of an electric machine.

BACKGROUND

In flameproof motors, the cables from the terminal box to the stator has to be sealed so that a possible explosion in either the stator frame or the terminal box does not traverse to other. The traditional design has attempted to overcome the problem with resin poured into the bushing from the terminal box to the stator frame.

Standards, however, evolve ever stricter and all the new generation of motors needs to fulfil the new standards. The newest standards require that the bushing is exposed to a thermal aging process, and then the bushing is tested against pressure. This has brought unforeseen problems in the design of the bushing. Resin-sealed bushings tend to fail in the test because the resin contracts during the thermal again process, opening gaps in the sealing. Hence there is need to improve the concept of the sealing.

BRIEF DESCRIPTION

The present invention seeks to provide an improvement to the problems in the flameproof electric machines. According to an aspect of the present invention, there is provided a protection arrangement as specified in claim 1.

According to another aspect of the present invention, there is provided a protection method in claim 9.

The invention has advantages. The sealing becomes tight and reliable also in both the thermal aging test and real life.

LIST OF DRAWINGS

Example embodiments of the present invention are described below, by way of example only, with reference to the accompanying drawings, in which FIG. 1 illustrates an example of an electrical machine with a terminal box;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. It is apparent to a person skilled in the art that the described apparatus may also comprise other functions and structures than those described in Figures and text. It should be appreciated that some details are irrelevant to the actual invention. Therefore, they need not be discussed in more detail here.

In prior art, finding a suitable resin which fulfils the most recent ex-standards and still passes pressure tests performed according to thermal ageing is hard. Using sheets (below named solid elements) with the diaphragm sealing has been found to allow a cost effective solution.

Figure 1:
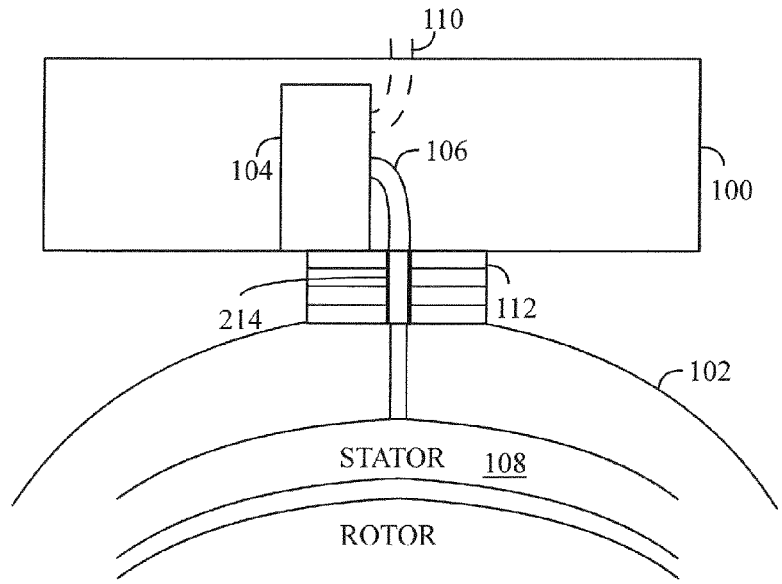

FIG. 1 illustrates an example of a terminal box 100 and an electric machine 102 related to it. The terminal box 100 refers to a housing, which encloses a terminal 104 of at least one electric cable. The terminal 104 has a connector (not shown in details in Figures) to which the at least one electric cable 106 between a stator 108 of the electric machine 102 can be connected. The terminal 104 has also a connector (not shown in details in Figures) to which an electric cable 110 from outside can be connected for supplying electric energy to or receiving electric energy from the electric machine 102. The terminal box 100 may include an openable or removable cover (not shown in Figures) for enabling an easy working condition with the cables and their connectors.

The electric machine 102 may be an electric generator or an electric motor.

FIG. 1 also illustrates a protection arrangement 112 of the electric machine 102 which comprises a plurality of solid elements 200, 202, 204, 206, 208, 210 (shown with reference numbers in FIG. 2) layered one after another between the terminal box 100 and the stator 108 of the electric machine 102. The solid elements 200 to 210 may form a stack. The protection arrangement 112 may be partly inside the terminal box 100. The protection arrangement 112 may be partly or fully inside the electric machine 102. The protection arrangement 112 may be in contact with the stator 108. That the elements 200 to 210 are solid refer to a continuous material layer (not a network or porous material). The term solid also refers to a material which is not flexible or at least the solid element 200 to 210 is less flexible than the insulation layer 300 of the electric cable 106.

Figure 2:
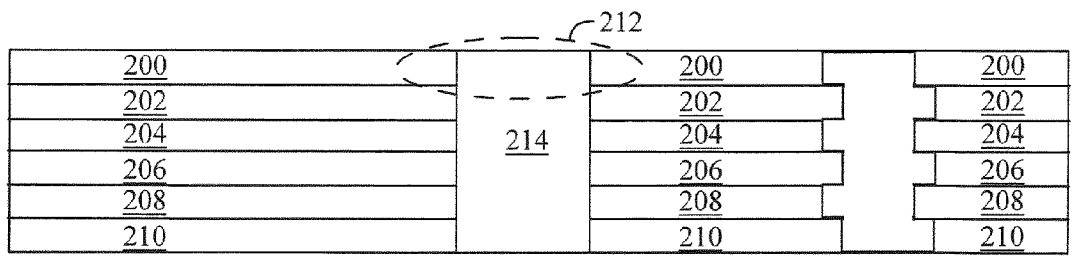
FIGS. 2 and 3 illustrate examples where a pin is inserted in a positioning hole for causing movement in the solid elements of the protection arrangement and thereby pressure against a cable in a cable channel.
Figure 3:
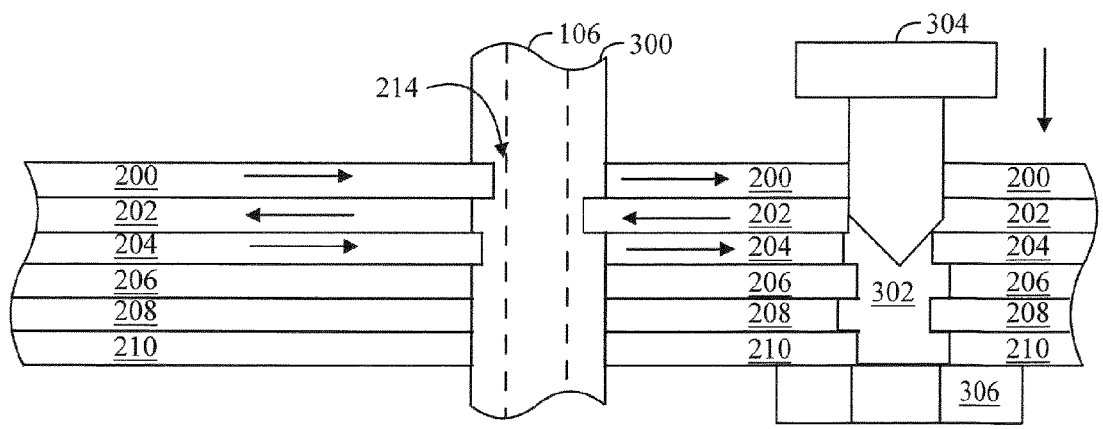

FIGS. 2 and 3 illustrate examples where a pin 304 is inserted in a positioning hole 302 for causing movement in the solid elements 200 to 210 of the protection arrangement and thereby potentially pressure against the cable 106 in a cable channel 214.

The solid elements 200 to 210 may be layered such that any one of the solid elements 202 to 208, except the solid elements 200, 210 at the top and bottom of the layered structure, are in contact with two solid elements on both sides of said one of the solid elements 202 to 208. Such a structure seals the layered structure laterally and allows no gaps between layers which is a protective measure. The solid elements 200 to 210 may move with respect to each other over a surface of a common boundary therebetween.

Each of the solid elements 200 to 210 comprises a cable hole 212 (in FIGS. 2 and 3, only the cable hole of the solid element 200 is marked with the reference sign 212 for clarity; other solid elements 202 to 210 naturally also have the cable hole 212). The cable holes 212 of the plurality of the solid elements 200 to 210 are arranged to at least partially overlap with each other in order to have a cable channel 214 formed of the successive cable holes 212 through the solid elements 200 to 210.

At least a part of the solid elements 200 to 210 are adjustable in a radial direction of the cable channel 214. The adjustability may relate to a movement of the solid element 200 to 210 as a whole or a movement within the solid element 200 to 210.

Figure 4:
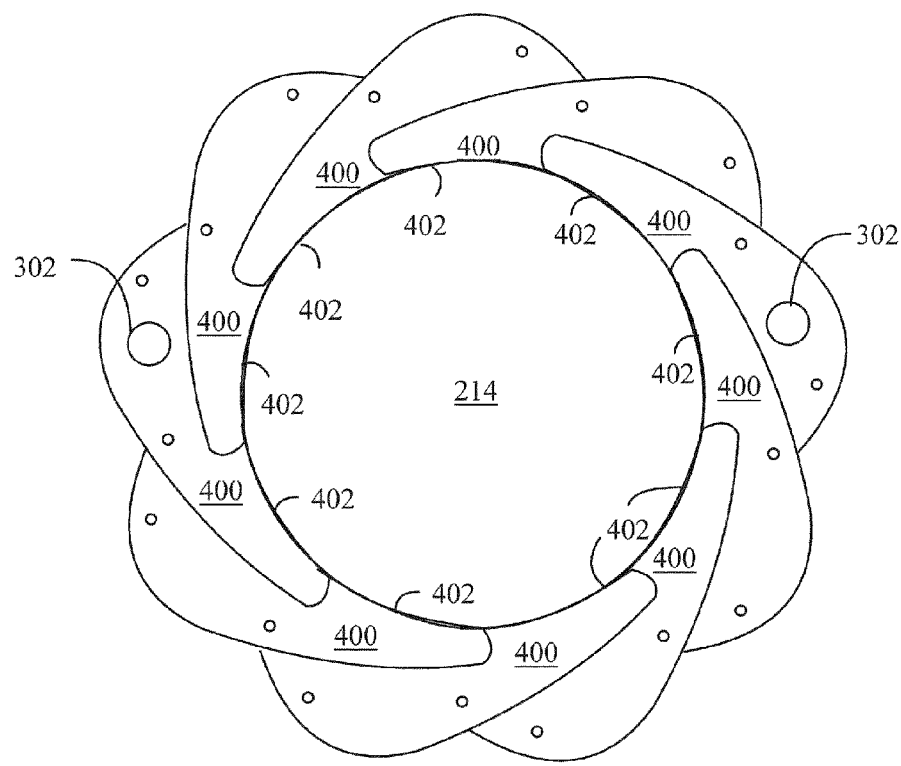
FIGS. 4 and 5 illustrate an example of an iris type of solid element.
Figure 5:
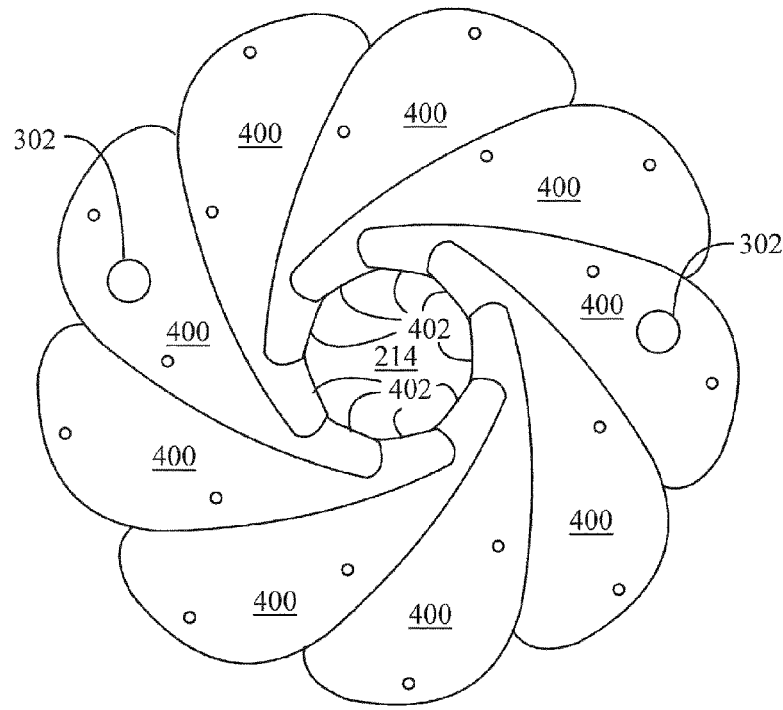

FIGS. 2 and 3 illustrate an example of an embodiment of the protection arrangement 112 where the solid elements 200 to 210 comprise one or more flat plates, each of which has a fixed size cable hole 212. FIGS. 4 and 5 illustrate solid elements 200 to 210 with an iris type of diaphragm.

In embodiments according to FIGS. 2 and 3, where the solid elements 200 to 210 may be solid plates, the adjustment means that the whole plates of the solid elements 200 to 210 may move in a direction perpendicular to a longitudinal axis of the cable channel 214. The movement of the plates is also perpendicular to a direction of a normal of the plates.

The adjustability in the radial direction of the cable channel 214 allows at least a part of the solid elements 200 to 210 to make a diameter of the cable channel 214 equal to or smaller than a diameter of the electric cable 106 input or inputtable in the cable channel 214 in response to adjustment in the radial direction.

At least one of the plates of the solid elements 200 to 210 may be adjustable by movement with respect to the other the solid elements 200 to 210 in the radial direction. In an embodiment, the adjustment may move sectors of inner edges of the cable holes 212 of the solid elements 200 to 210 towards each other such that a distance therebetween becomes equal to or smaller than a diameter of the electric cable 106.

The adjustability may also allow the at least a part of the solid elements 200 to 210 to press against an insulating layer 300 of the cable 106 in the cable channel 214.

A surface of the cable hole 212 of the one or more solid elements 200 to 210, which are mechanically adjusted to press against the cable 106, may sink partly into the insulating layer 300 of the cable 106. The surface of the cable hole 212 includes a sector of an inner edge of the at least one fixed size cable hole 212. The depth of sinking of the solid elements 200 to 210 into the insulating layer 300 may be in a range of hundreds of micrometers to millimeters, for example.

That the solid elements 200 to 210 are independently adjustable means that any mechanical adjustment done to one of the solid elements 200 to 210 does not necessarily have correlation with the mechanical movement related to any other solid element 200 to 210.

The protection arrangement 112 comprises also a locking mechanism 302, 304 which may be used to immobilize the at least part of solid elements 200 to 210 in order to have a stable sealing between the cable 106 and the cable channel 214. The locking mechanism may then be used to immobilize the movement of the at least one plate with respect to the other solid elements 200 to 210.

The locking mechanism may comprise at least one positioning hole 302 in each of the solid elements 200 to 210 and at least one pin 304 which may be inserted in the positioning hole 302.

In an embodiment, the positioning holes 302 of the different solid elements 200 to 210 correspond to each other in a known manner when layered one after another. In an embodiment, the locking mechanism may comprise at least one pin 304, which is insertable into the at least one positioning hole 302. The pin 304 is configured to immobilize the movement of the solid elements 200 to 210 in the radial direction.

As can be seen in FIGS. 2 and 3, when the pin 304 is inserted (see arrow downwards) in the positioning hole 302, the pin 304 pushes the plates of the solid elements 200 to 210 in a lateral direction (see arrows sideways) with respect to the longitudinal axis of the cable channel 214. The cable holes 212 of the solid elements 200 to 210 also move the same amount in the lateral direction which causes the surfaces of the cable holes 212 to become in contact with the cable 106. Finally, the surface of the cable hole 212 may sink into the insulation layer 300 of the cable 106. The insulation layer 300 may be made of polymer which rather easily deforms under pressure without a fracture or breakage. The insulation layer 300 is also durable in the aging test and use.

In an embodiment examples of which are illustrated in FIGS. 4 and 5, at least one of the solid elements 200 to 210 may comprise an iris diaphragm. The iris diaphragm has a plurality of leaves 400 which may also be called finger blades. The leaves 400 may be in a case structure (case is not shown in FIGS. 4 and 5). The leaves 400 may be made of steel or plastic, for example.

A section 402 of an outer edge of each of the plurality of the leaves 400 may be a part of an inner surface of the cable channel 214. The plurality of leaves 400 may be moved with respect to each other in the radial direction of the cable channel 214 for making a diameter of the cable channel 214 equal to or smaller than a diameter of the electric cable 106 input in the cable channel 214 in response to adjustment in the radial direction.

The plurality of leaves 400 may also be moved with respect to each other in the radial direction of the cable channel 214 for pressing at least a part of the section 402 of the outer edge against the insulating layer 300 of the cable 106 in the cable channel 214. The radial movement of the leaves 400 of the iris diaphragm of one of the solid elements 200 to 210 may result in a centralized or eccentric cable hole 212 with respect to the cable channel 214 as a whole or in average. The locking mechanism, which may have at least one positioning hole 302 in at least one of the leaves 400, and at least one pin 304 for the at least one positioning hole, may immobilize the plurality of leaves 400.

In an embodiment, where the plates have the fixed size cable holes 214 or the iris diaphragm, a distance of at least one of the positioning holes 302 of one of the plates (solid elements 200 to 210) from the cable hole 106 may be different from a distance of at least one corresponding positioning hole 302 of at least one other of the plates (solid elements 200 to 210). In an embodiment, a location of at least one of the positioning holes 302 of one the solid elements 200 to 210 with respect to its cable hole 212 is different from that of at least one other of the solid elements 200 to 210. That is, the positioning holes 302 of different solid elements 200 to 210 may have plane-geometrical shapes, whose center of weight differs from each other. In an embodiment, the center of weight of a polygon drawn via the positioning holes 302 of one of the solid elements 200 to 210 deviates from that of at least one other of the solid elements 200 to 210.

The locking mechanism may comprise at least one pin 304 each being for one of the positioning holes 302. The pin 304 is configured move the plates with respect to each other in the radial direction by an amount of the distance, decentralize the cable holes 302 with respect to each other in a corresponding manner, and immobilize the movement of the solid elements 200 to 210 at the decentralized positions. The decentralization of the positioning holes 302 can be seen as a zig-zag contour of the inner surface of the positioning holes in FIG. 2. The zig-zag contour of the positioning holes 302 becomes the zig-zag contour of the cable channel 214 when the pin 304 is inserted in the positioning holes 302.

In an embodiment, the pin 304 may have an enlarged structure at one end, the enlarged structure having a lateral measure larger than the diameter of the positioning hole 302. The pin 304 may be like a nail or a screw, for example, where the enlarged structure is or is similar to the head of the screw. Hence, the pin 304 may only be inserted in one position to the positioning hole 302. The pin 304 may extend through the stack of the solid elements 200 to 210. An opposite end of the pin 302 to the enlarged structure may be attached to a securing structure 306 such that the pin 304 cannot loosen in normal use and/or without deterministic attempts. The pin 304 may have thread such that the securing structure may be a nut or the like.

The movement of the cable holes 212 of the solid elements 200 to 210 which extends to the a diameter of the electric cable 106 causes the surfaces of the cable holes 212 to become in contact with the cable 106. In an embodiment, the at least a part of the solid elements 200 to 210 may finally sink into the insulation layer 300 of the electric cable 106 in response to adjustment in the radial direction.

The solid elements 200 to 210 may be made of any fire and pressure proof material. The solid elements 200 to 210 may comprise or be made of metal, for example. The solid elements 200 to 210 may comprise or be made of plastic, for example. The solid elements 200 to 210 may comprise or be made of silicon, for example. It may be important that the material of the solid elements 200 to 210 is fireproof. In tests, temperatures of more than 100° C. are used (155° C., for example). Alternatively or often additionally, the solid elements 200 to 210 may have to endure high pressures, from a few bars to tens or even hundreds bars.

For simplicity only a single electric cable 106 is shown in Figures but the design works also for a plurality cables. One cable channel 214 may have one or more electric cables.

Advantages of the technical solution described above may include the following. The sealing is reliable without resin although resin may also be used. The reliable sealing is based on usage of diaphragm-style sheets 200 to 210 which may have the fixed size cable hole and/or the iris diaphragm to lock and seal the electric cable 106 in the cable channel. The sealing is thermally stable and immune to thermal expansion. The electric cable 106 can be removed and replaced by opening the locking mechanism, i.e removing the pin(s) 304 from the positioning hole(s) 302 which allows maintenance, for example.

Using the solid elements 200 to 210 with the diaphragm sealing has been found to allow cost effective solution without using resins which may be dangerous and toxic. Sealing the electric cable 106 with the solid elements 200 to 210 makes it possible to protect the electric machine 102 with the terminal box 100 during the manufacturing process without curing time of the resin. It may also be possible depending on certification agency to pass the seal without thermal ageing if the solid elements 200 to 210 are used, because thermal ageing does not affect the solid elements 200 to 210. This is particularly true if the solid elements 200 to 210 are made of metal.

Figure 6:
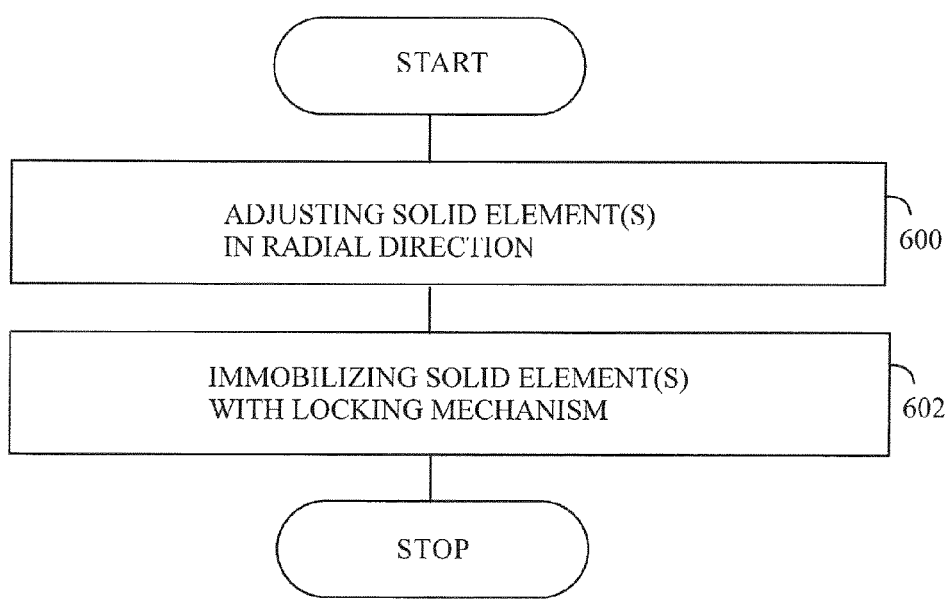
FIG. 6 illustrates of an example of a flow chart of a sealing method.

FIG. 6 is a flow chart of the protection method. The protection arrangement 112 comprises a plurality of solid elements 200 to 210 layered one after another between a terminal box 100 and a stator 108 of the electric machine 102. Each of the solid elements 200 to 210 comprises a cable hole 212, and the cable holes 212 are arranged to at least partially overlap with each other in order to have a cable channel 214 of the successive cable holes 212 through the solid elements 200 to 210. In step 600, at least a part of the solid elements 200 to 210 are adjusted in a radial direction of the cable channel 214 for making a diameter of the cable channel 214 equal to or smaller than a diameter of the electric cable 106 input in the cable channel 214 in response to adjustment in the radial direction. In step 602, the at least part of solid elements 200 to 210 are immobilized with a locking mechanism 302, 304 of the protection arrangement 112.

It will be obvious to a person skilled in the art that, as technology advances, the inventive concept can be implemented in various ways. The invention and its embodiments are not limited to the example embodiments described above but may vary within the scope of the claims.

The invention claimed is:

1. A protection arrangement of an electric machine, the protection arrangement comprises:
a plurality of solid elements layered one after another between a terminal box and a stator of the electric machine;
each of the solid elements comprises a cable hole, and the cable holes are arranged to at least partially overlap with each other in order to have a cable channel of the successive cable holes through the solid elements;
at least a part of the solid elements are adjustable in a radial direction of the cable channel for making a diameter of the cable channel equal to or smaller than a diameter of the electric cable input in the cable channel in response to adjustment in the radial direction; and
a locking mechanism which is configured to immobilize the at least part of solid elements.

2. The apparatus of claim 1, wherein each of the locking mechanism of the solid elements comprises one or more positioning holes, the positioning holes of the solid elements being configured to correspond to each other when layered one after another.

3. The apparatus of claim 2, wherein the locking mechanism comprises at least one pin, which is insertable to the at least one positioning hole, the at least one pin being configured to immobilize the movement of the solid elements in the radial direction.

4. The apparatus of claim 1, wherein the solid elements comprise one or more plates each of which has a fixed size cable hole;
at least one of the plates is configured to be adjustable by movement with respect to the other the solid elements in the radial direction for moving sectors of inner edges of the cable holes of the solid elements towards each other for a distance equal to or smaller than a diameter of the electric cable therebetween; and
the locking mechanism is configured to immobilize the movement of the at least one plate with respect to the other solid elements.

5. The apparatus of claim 4, wherein a distance of at least one of the positioning holes of one of the plates of the solid elements, which has the fixed size cable hole, from the cable hole is different from a distance of at least one corresponding positioning hole of at least one other of the plates; and
the locking mechanism comprises at least one pin each of which is for one of the positioning holes, the at least one pin being configured move the plates with respect to each other in the radial direction by the distance, decentralize the cable holes with respect to each other correspondingly, and immobilize the movement of the solid elements at the decentralized positions.

6. The apparatus of claim 1, wherein the at least one solid element comprises an iris diaphragm with a plurality of leaves;
a section of an outer edge of each of the plurality of leaves is configured to be a part of an inner surface of the cable channel;
the plurality of leaves are configured to move with respect to each other in the radial direction of the cable channel for making a diameter of the cable channel equal to or smaller than a diameter of the electric cable input in the cable channel in response to adjustment in the radial direction; and
the locking mechanism is configured to immobilize the plurality of leaves.

7. The apparatus of claim 1, wherein the at least a part of the solid elements are configured press against an insulating layer of a cable in the cable channel.

8. The apparatus of claim 1, wherein the at least a part of the solid elements are configured to sink into the insulation layer of the electric cable in response to adjustment in the radial direction.

9. A protection method, wherein the protection arrangement comprises a plurality of solid elements layered one after another between a terminal box and a stator of the electric machine, each of the solid elements comprises a cable hole, and the cable holes are arranged to at least partially overlap with each other in order to have a cable channel of the successive cable holes through the solid elements; the method comprises:
adjusting at least a part of the solid elements in a radial direction of the cable channel for making a diameter of the cable channel equal to or smaller than a diameter of the electric cable input in the cable channel in response to adjustment in the radial direction; and
immobilizing, with a locking mechanism of the protection arrangement, the at least part of solid elements.

10. The apparatus of claim 2, wherein the solid elements comprise one or more plates each of which has a fixed size cable hole;
at least one of the plates is configured to be adjustable by movement with respect to the other the solid elements in the radial direction for moving sectors of inner edges of the cable holes of the solid elements towards each other for a distance equal to or smaller than a diameter of the electric cable therebetween; and
the locking mechanism is configured to immobilize the movement of the at least one plate with respect to the other solid elements.

11. The apparatus of claim 3, wherein the solid elements comprise one or more plates each of which has a fixed size cable hole;
at least one of the plates is configured to be adjustable by movement with respect to the other the solid elements in the radial direction for moving sectors of inner edges of the cable holes of the solid elements towards each other for a distance equal to or smaller than a diameter of the electric cable therebetween; and
the locking mechanism is configured to immobilize the movement of the at least one plate with respect to the other solid elements.

12. The apparatus of claim 10, wherein
a distance of at least one of the positioning holes of one of the plates of the solid elements, which has the fixed size cable hole, from the cable hole is different from a distance of at least one corresponding positioning hole of at least one other of the plates; and
the locking mechanism comprises at least one pin each of which is for one of the positioning holes, the at least one pin being configured move the plates with respect to each other in the radial direction by the distance, decentralize the cable holes with respect to each other correspondingly, and immobilize the movement of the solid elements at the decentralized positions.

13. The apparatus of claim 11, wherein
a distance of at least one of the positioning holes of one of the plates of the solid elements, which has the fixed size cable hole, from the cable hole is different from a distance of at least one corresponding positioning hole of at least one other of the plates; and
the locking mechanism comprises at least one pin each of which is for one of the positioning holes, the at least one pin being configured move the plates with respect to each other in the radial direction by the distance, decentralize the cable holes with respect to each other correspondingly, and immobilize the movement of the solid elements at the decentralized positions.

14. The apparatus of claim 2, wherein the at least one solid element comprises an iris diaphragm with a plurality of leaves;
a section of an outer edge of each of the plurality of leaves is configured to be a part of an inner surface of the cable channel;
the plurality of leaves are configured to move with respect to each other in the radial direction of the cable channel for making a diameter of the cable channel equal to or smaller than a diameter of the electric cable input in the cable channel in response to adjustment in the radial direction; and
the locking mechanism is configured to immobilize the plurality of leaves.

15. The apparatus of claim 3, wherein the at least one solid element comprises an iris diaphragm with a plurality of leaves;
a section of an outer edge of each of the plurality of leaves is configured to be a part of an inner surface of the cable channel;
the plurality of leaves are configured to move with respect to each other in the radial direction of the cable channel for making a diameter of the cable channel equal to or smaller than a diameter of the electric cable input in the cable channel in response to adjustment in the radial direction; and
the locking mechanism is configured to immobilize the plurality of leaves.

16. The apparatus of claim 2, wherein the at least a part of the solid elements are configured to press against an insulating layer of a cable in the cable channel.

17. The apparatus of claim 3, wherein the at least a part of the solid elements are configured to press against an insulating layer of a cable in the cable channel.

18. The apparatus of claim 2, wherein the at least a part of the solid elements are configured to sink into the insulation layer of the electric cable in response to adjustment in the radial direction.

19. The apparatus of claim 3, wherein the at least a part of the solid elements are configured to sink into the insulation layer of the electric cable in response to adjustment in the radial direction.

20. The apparatus of claim 4, wherein the at least a part of the solid elements are configured to sink into the insulation layer of the electric cable in response to adjustment in the radial direction.

\* \* \* \* \*